(12) United States Patent
Jain et al.

(10) Patent No.: US 10,477,162 B2
(45) Date of Patent: Nov. 12, 2019

(54) SYSTEMS AND METHODS FOR INTEGRATED AUTO-TRIGGERING IMAGE CAPTURE OF ENCLOSURE INTERIORS

(71) Applicant: Cooler IoT, LLC, Reston, VA (US)

(72) Inventors: Durlabh Jain, Herndon, VA (US); Karan Bakshi, Herndon, VA (US); Roy Mehta, New Hope, PA (US)

(73) Assignee: COOLER IOT LLC, Reston, VA (US)

( * ) Notice: Subject to any disclaimer, the term of this patent is extended or adjusted under 35 U.S.C. 154(b) by 268 days.

(21) Appl. No.: 14/527,702

(22) Filed: Oct. 29, 2014

(65) Prior Publication Data

US 2016/0080705 A1    Mar. 17, 2016

Related U.S. Application Data

(60) Provisional application No. 62/049,334, filed on Sep. 11, 2014.

(51) Int. Cl.
*H04N 7/18* (2006.01)
*G08B 13/196* (2006.01)

(52) U.S. Cl.
CPC ....... *H04N 7/188* (2013.01); *G08B 13/19654* (2013.01); *G08B 13/19665* (2013.01); *G08B 13/19632* (2013.01); *G08B 13/19695* (2013.01)

(58) Field of Classification Search
CPC .......... H04N 7/181; H04N 5/232; H04N 7/18; H04N 7/188; H04N 7/183; H04N 5/23238; H04N 5/2252; H04N 7/185; G08B 13/19695; G08B 13/19697; G08B 13/19656; G08B 13/19602; G06K 9/00771

See application file for complete search history.

(56) References Cited

U.S. PATENT DOCUMENTS

| | | |
|---|---|---|
| 2006/0237427 A1 | 10/2006 | Logan |
| 2007/0103550 A1 | 5/2007 | Frank et al. |
| 2008/0055040 A1 | 3/2008 | Lizza et al. |
| 2011/0292213 A1* | 12/2011 | Lacey .................... H04N 7/186 348/153 |
| 2014/0267716 A1* | 9/2014 | Child ..................... H04N 7/186 348/143 |
| 2014/0300265 A1* | 10/2014 | Lee ......................... F25D 29/00 312/405.1 |

OTHER PUBLICATIONS

ISA/US, "International Search Report and Written Opinion", for PCT application No. PCT/US14/63264, Feb. 20, 2015, 7 pages.

* cited by examiner

*Primary Examiner* — Farhan Mahmud
(74) *Attorney, Agent, or Firm* — Kang S. Lim

(57) ABSTRACT

The present invention provides an enclosure having an entry barrier with an integrated auto-triggering image capture system. The enclosure includes an enclosure body, an entry barrier coupled to the enclosure body, and an integrated image capture system with an activator and an image sensor. The activator is coupled to the entry barrier and generates a trigger upon detecting a positional change of the entry barrier relative to the enclosure body. The image sensor is coupled to both the entry barrier and the activator, and is triggered by the activator to capture images of the enclosure interior.

21 Claims, 6 Drawing Sheets

SYSTEMS AND METHODS FOR INTEGRATED AUTO-TRIGGERING IMAGE CAPTURE OF ENCLOSURE INTERIORS

CROSS-REFERENCE TO RELATED APPLICATIONS

This non-provisional application claims the benefit of and is a continuation-in-part of U.S. provisional patent application No. 62/049,334, filed on Sep. 11, 2014, entitled "SYSTEMS AND METHODS FOR INTEGRATED AUTO-TRIGGERING IMAGE CAPTURE OF ENCLOSURE INTERIORS," which application is hereby fully incorporated in its entirety by this reference.

BACKGROUND

The present invention relates to systems and methods for cost effective monitoring of storage facilities.

In today storage environments, a wide range of items, e.g., consumer products, need to be securely stored from short periods to extended periods. Storage is needed or preferred for a wide variety of reasons including, for example, transportation, stock piling, freezing and/or preservation of foods such as smoked meat and dried/pickled produce.

Hence automation of surveillance of stored goods to enhance quality control (reduce tampering and contamination), integrity, stock-checking (for scheduling restocking), shrinkage (loss), security, reliability, maintaining chain-of-control, safety, is much needed because of high labor cost. Such applications can range from perishable foods, high value consumer goods, controlled substances and potentially harmful or dangerous products such as corrosive chemicals, biohazard, court evidence, and weapons.

It is therefore apparent that an urgent need exists for more cost effective surveillance systems that are inexpensive and easy to install and maintain. This improved integrated systems enables users to remotely monitor storage facilities and optionally to be notified of exception conditions.

SUMMARY

To achieve the foregoing and in accordance with the present invention, cost effective systems and methods for surveillance of storage facilities is provided.

In one embodiment, an enclosure has an auto-triggering image capture system integrated with an entry barrier. The entry barrier of the enclosure is coupled to the enclosure body. The integrated image capture system includes an activator and an image sensor. The activator is configured to generate a trigger upon detecting a positional change of the entry barrier relative to the enclosure body. The image sensor is configured to be triggered by the activator to capture at least one image of at least a portion of an interior of the enclosure.

In some embodiments, additional useful data can also be captured by the capture system such as enclosure interior temperature, content temperature, ambient environmental temperature, coolant loss, humidity, lighting level and/or power supply status. Other useful data include door positions and/or status, such as when a door is accidentally left ajar or unlocked.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
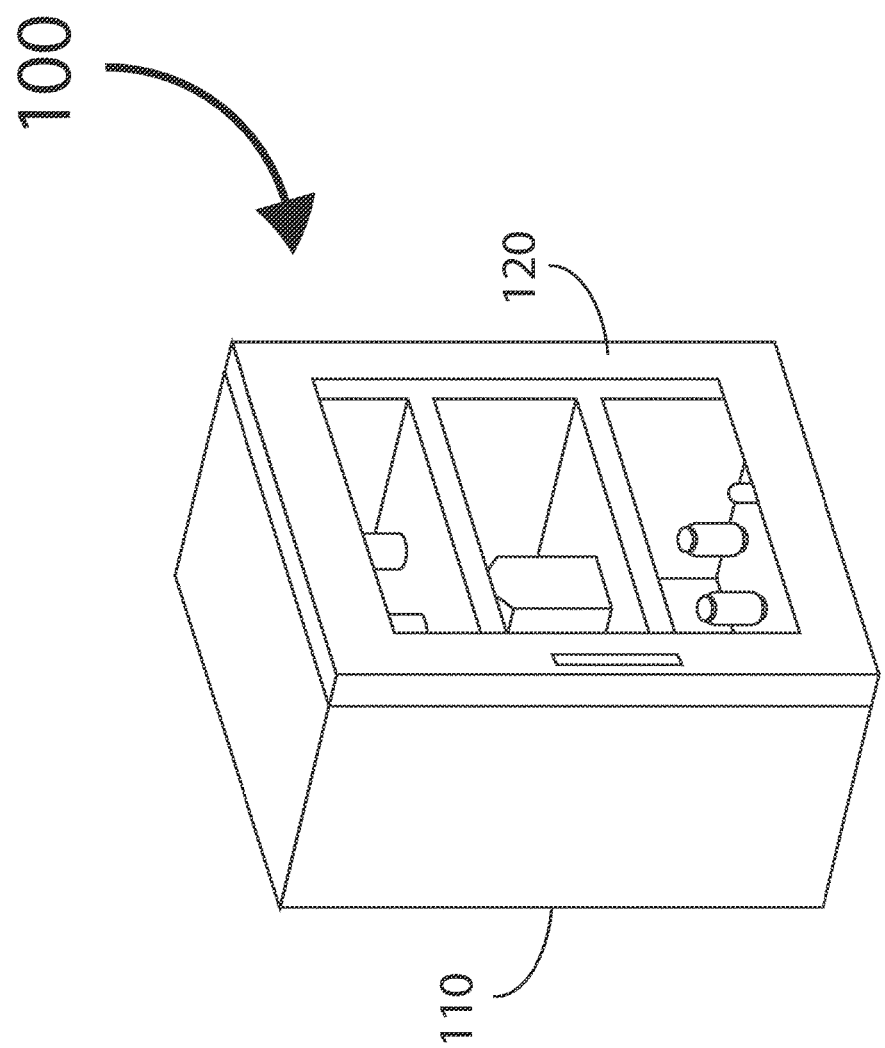
FIG. 1 is a perspective view of an enclosure having an integrated image capture system in accordance with one embodiment of the present invention.
Figure 2:
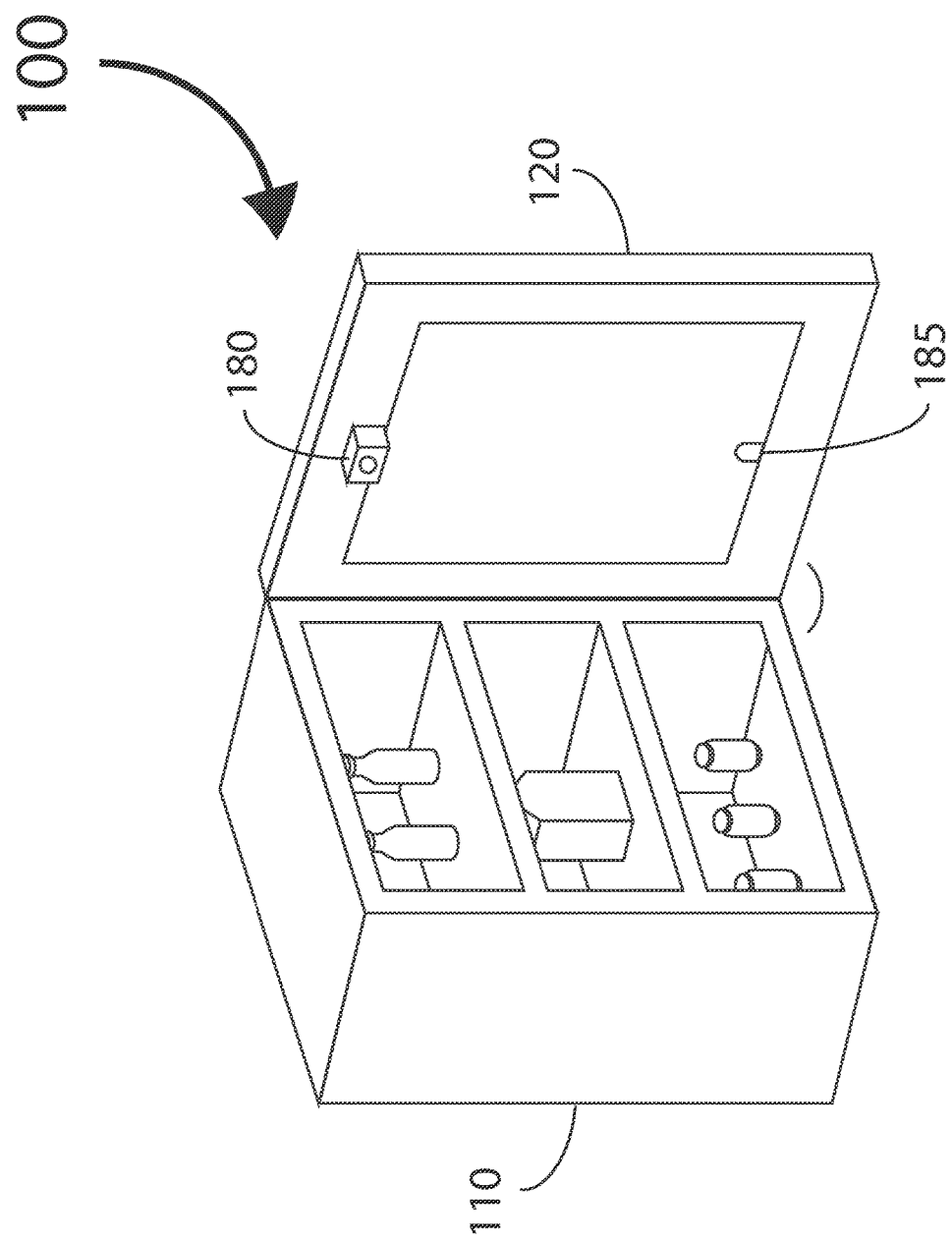
FIG. 2 is a perspective view of the enclosure of FIG. 1 with an open hinged door.
Figure 3:
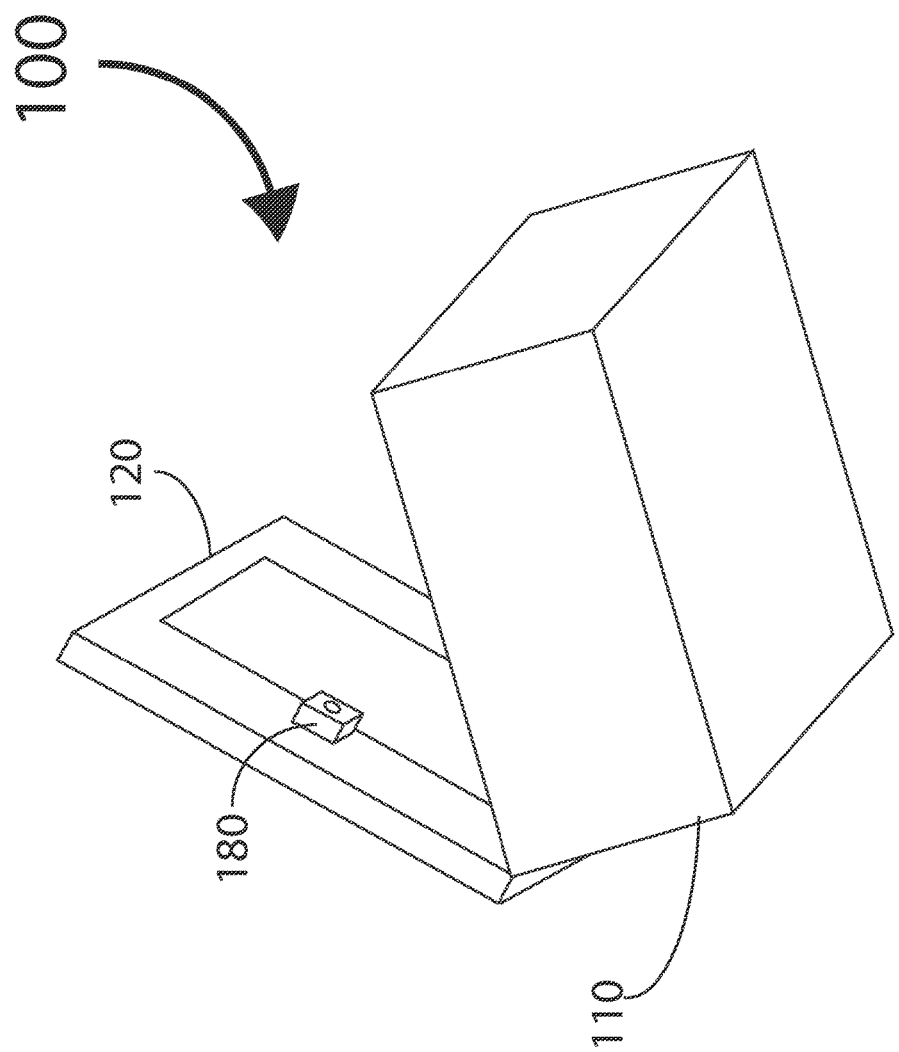
FIG. 3 is another perspective view the enclosure of FIG. 1 with the open door.

To facilitate discussion, FIGS. 1-3 are perspective views of one embodiment of an enclosure 100 having an integrated image capture system 180 in accordance with the present invention. In this embodiment, the enclosure 100 includes an enclosure body 110, an entry barrier 120, e.g., a hinged door, and the integrated image capture system 180.

Referring to FIG. 2, a perspective view of the enclosure 100, e.g., a refrigerator, with an open door 120, integrated image capture system 180 can be located along the interior top frame of door 120. Other suitable alternate locations for attaching image capture system 180 include bottom frame 185 of door 120.

In this embodiment, integrated image capture system 180 includes an image sensor (not shown) and an activator (not shown). As discussed above, both the image sensor and the activator are operatively coupled, e.g., physically attached, to entry barrier 120 of enclosure 100.

Upon detecting a positional change of the entry barrier 120 relative to the enclosure body 110, the activator of system 180 generates a trigger. The positional change of the entry barrier 120 can be detected by computing movement and/or acceleration, e.g., using a gyroscope, an accelerometer, a contact switch, proximity sensor and/or a photoelectric sensor.

Upon receiving a trigger from the activator, the image sensor of system 180 can capture at least one still and/or video image of at least a portion of an interior of the enclosure body 110. In this example, image sensor is able to capture a first image the contents of enclosure 100 just as the entry barrier 120 is opening, and a second image of the contents of the enclosure 100 while (or after) the entry barrier 120 is closing, thereby providing stock status information for restocking and/or invoicing purposes. Subsequently, the image capture system 180 is able to capture a follow-up image for updating the content of enclosure 100. System 180 is capable of capturing an image by taking into account the speed of the entry barrier 120 and the angle for capturing the image. Appropriate lenses for wide or specific angles may be included in the system 180 (not shown). Whether the entry barrier 120 is opened slowly or quickly, the system 180 uses accelerometer sensor (not shown) to determine when to capture an image.

Figure 4:
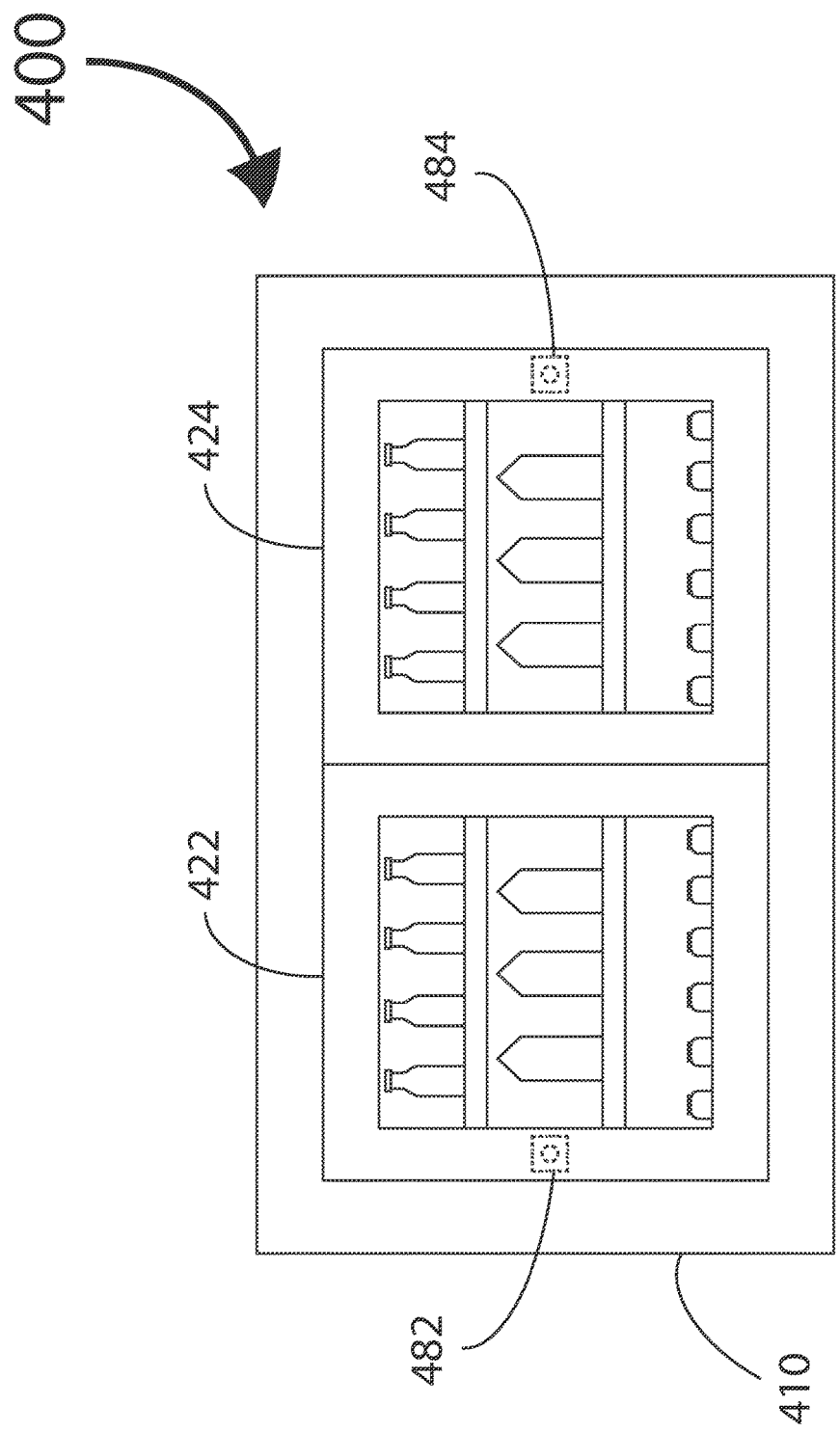
FIG. 4 is a front view of another embodiment of an enclosure with sliding doors closed.
Figure 5:
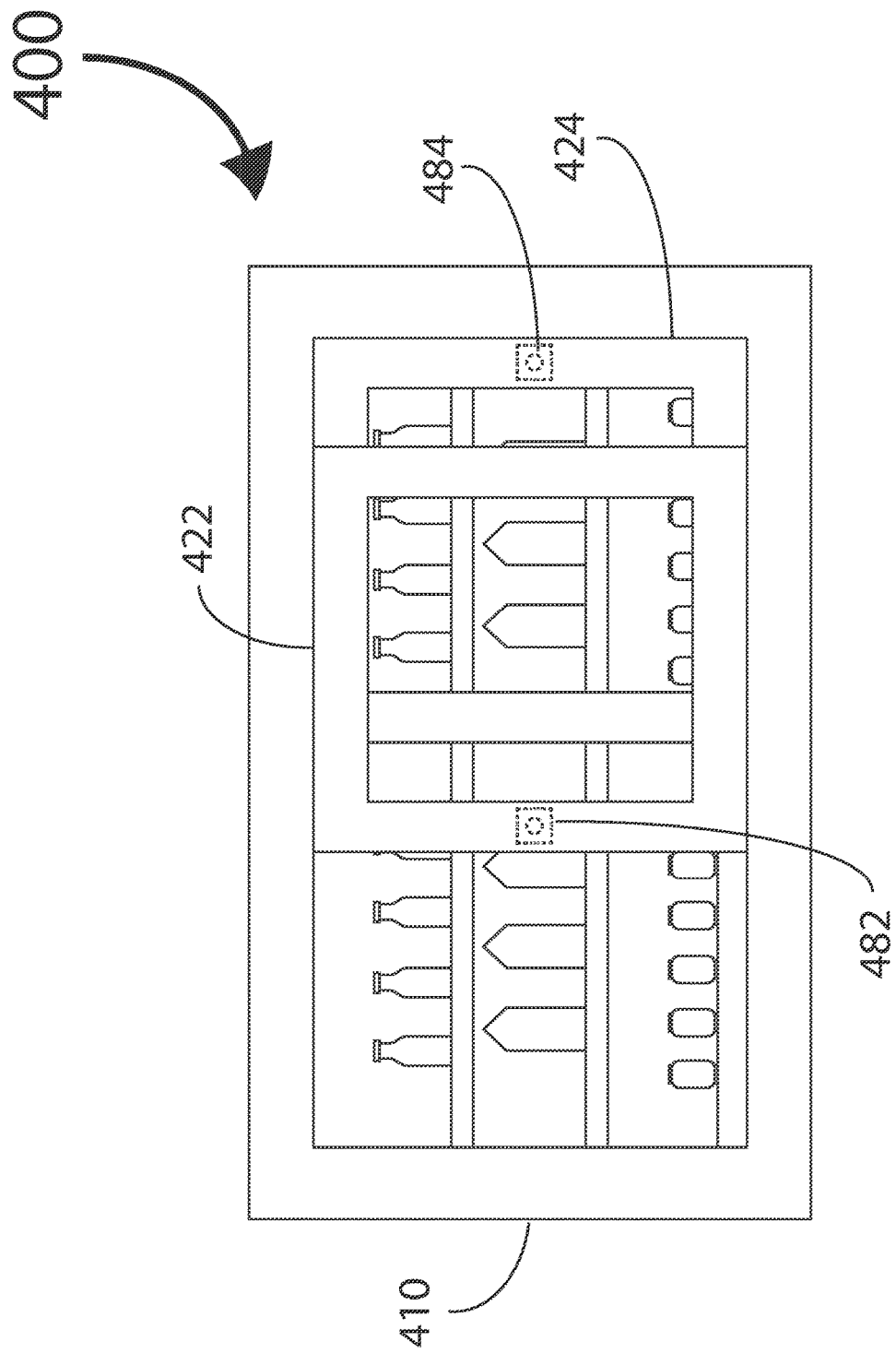
FIG. 5 is a front view of the enclosure of FIG. 4 with the left door ajar.

In another embodiment as illustrated by FIGS. 4 and 5, the enclosure 400 includes one or more of entry barriers, e.g., sliding doors 422 & 424, with one or more corresponding integrated image capture systems, e.g., systems 482 & 484. In FIG. 4 left door 482 is closed, while in FIG. 5 left door 482 is substantially open.

In this embodiment of enclosure 400, integrated image capture systems 482 & 484 can be located along the interior side frames of sliding doors 422 & 424, respectively. Other suitable alternate locations for attaching image capture systems 482 & 484 include interior top and bottom frames of doors 422 & 424.

Each of integrated image capture systems 482 & 484 include an image sensor (not shown) and an activator (not shown). The respective image sensors and the activators of systems 482, 484 are operatively coupled, e.g., physically attached, to the respective entry barriers 422 & 424.

The operation of image capture systems 482 & 484 is similar to that described above for image capture system 180. For example, upon detecting a positional change of the entry barrier 422 relative to the enclosure body 410, the activator of system 482 generates a trigger. The positional change of the entry barrier 422 can be detected by computing movement and/or acceleration. Upon receiving a trigger from the activator, the image sensor of system 482 can capture at least one still and/or video image of at least a portion of an interior of the enclosure body 410.

In some embodiments, the image capture systems 180, 482 & 484 may have one or more operational pre-settings with fixed zoom, focus and/or orientation after the initial calibration during installation. Depending on the application and/or door configuration, in other embodiments, the image capture systems 180, 482 & 484 may be capable of optically, digitally and/or mechanically (e.g., with a motorized mount) zooming in/out, panning, and tilting thereby enabling systems 180, 482 & 484 to substantially optimize the field-of-view relative to the contents of the respective enclosures 100 & 400.

Panning, tilting, focusing and/or zooming can be synchronized with the relative position of the entry barriers 120, 422 & 424 to substantially optimize the effective field-of-view of image capture systems 180, 482 & 484, respectively.

Figure 6A:
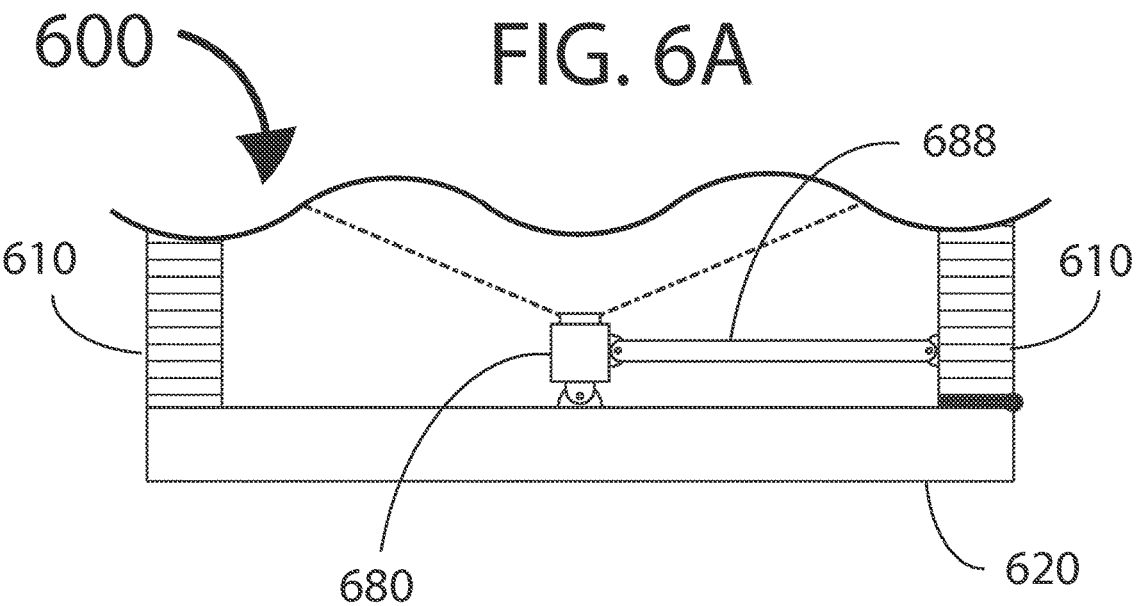
FIGS. 6A and 6B are top cutaway views of yet another embodiment of an enclosure with a mechanically synchronized integrated image capture system.
Figure 6B:
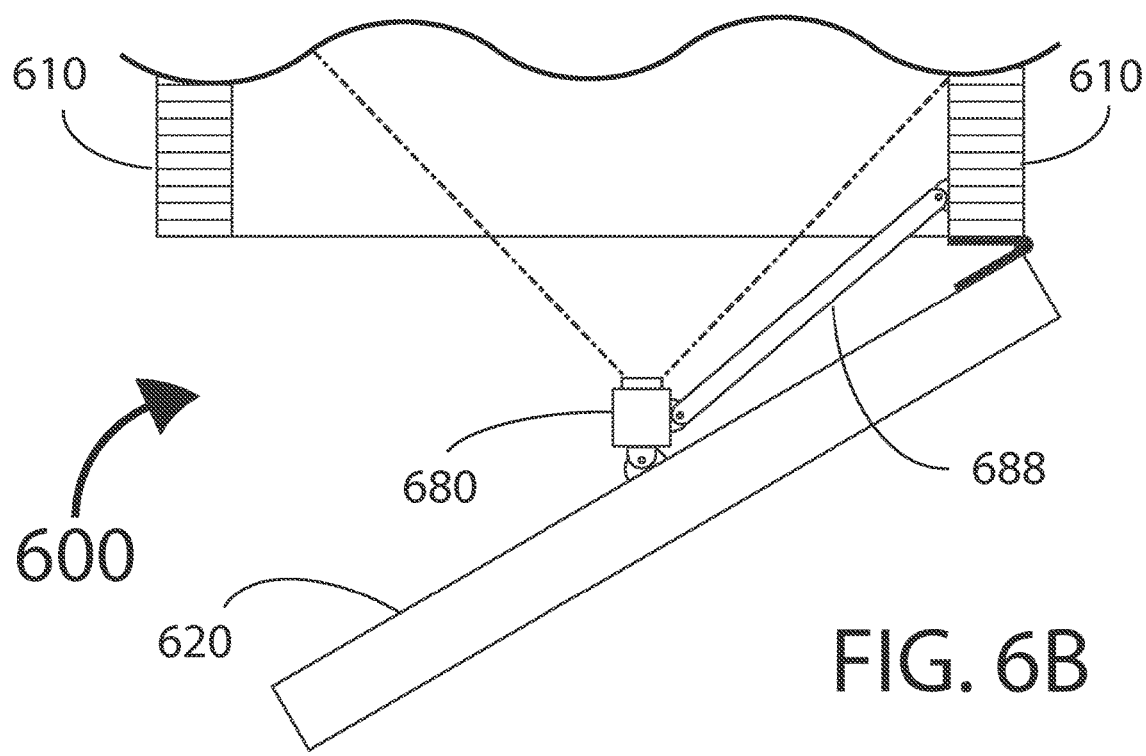

FIGS. 6A and 6B are top views of yet another embodiment of an enclosure 600 with entry barrier 620 in a closed position and partially open position, respectively. In this embodiment, synchronous panning with respect to the opening/closing of entry barrier 620 can also be accomplished by mechanically attaching a control bar 688 between the image capture system 680 and the enclosure body 610, thereby enabling the image capture system 680 to maintain a substantially optimal field-of-view of the contents of enclosure 600. In this embodiment, optional zooming, focusing, and/or tilting of image capture system 680 is also possible.

In the above described embodiments, image capture systems 180, 482, 484 & 680 may also be capable of adjusting, for example, focus, focal length, image resolution, frame rate, shutter speed and/or aperture (ISO), thereby enabling capture systems 180, 482, 484 & 680 to substantially optimize and/or manage tradeoffs in the image quality and/or quantity of the contents of enclosures 100, 400 & 600, respectively.

In some embodiments, additional useful data can also be captured by capture systems 180, 482, 484 & 680 such as enclosure interior temperature, content temperature, ambient environmental temperature, coolant loss, humidity, lighting level and/or power supply status. Other useful data include door positions and/or status, such as when a door is accidentally left ajar or unlocked. For efficiency, the image capture systems 180, 482, 484 & 680 may determine specific conditions with respect to location and/or acceleration of the entry barriers 120, 422, 424 & 620 in combination with any additional data in order to selectively capture images, for example, determining the kind of events associated with particular acceleration profiles and degree of entry barrier opening.

Within the scope of the present invention, the above described methods and systems are contemplated for a wide variety of applications, such as keeping track of contents of a commercial restaurant walk-in freezer, contents of a safe deposit box or a safe, jewelry in a display case, firearms in a police station armory. Accordingly, suitable entry barriers for enclosures can correspond to openings with a range of sizes, shapes, and materials, and can include windows, container tops, stops, lids, porthole covers and/or hatches.

The above described methods and systems can also be useful for a wide variety of purposes. Examples include image capture of cargo containers covering the loading and/or unloading to determine if the container contents match a bill of lading and/or the customs declaration, capturing theft and/or unauthorized access, and capturing substitution of fake goods/documents in a warehouse, stockroom, and/or file-room. Capturing and preserving evidence of unauthorized access to computer server centers, police/national guard armories and/or bank vaults.

Many other additions and modifications to the above described embodiments are contemplated and are within the scope of the present invention. For example, a second optional activator (not shown), e.g., a motion sensor, can be attached to the enclosure body to provide a baseline reference, so that if the entire enclosure is moved, e.g., when a container is being lifted from the shore to a container ship, the image capture system can determine that the resulting acceleration is not from the motion of the container door relative to the container.

In some implementations, such as rows of refrigerated displays in a supermarket or shipping containers stored together in a warehouse, each of the image capture systems can communicate wirelessly with a local communication hub, such as a WiFi router or switch. In addition, some or all of these adjacent image capture systems can be wirelessly daisy-chained to form a pseudo local area network (LAN) so that a first image capture system can communicate with the hub via a second image capture system. Similarly, one or more of a cluster of image capture systems may have wide area networking (WAN) capability, and can be configured to communicate remotely with a remote enclosure management system on behalf of the cluster of image capture systems. To enhance security and/or privacy, it is also possible to encrypt communications between the image capture system(s) and the remote enclosure management system.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An integrated auto-triggering image capture system useful in association with refrigerated enclosure having an entry barrier, the integrated image capture system comprising:
    an activator configured to be operatively coupled to an entry barrier associated with a refrigerated enclosure, wherein the activator is further configured to generate a trigger upon detecting a positional change of the entry barrier relative to a body of the enclosure, wherein the position change ranges from a closed position to an opened position; and
    an interior image sensor configured to be attached to an interior-facing location of the entry barrier thereby causing the interior image sensor to move relative to the body of the enclosure in response to a corresponding motion of the entry barrier, the image sensor configured to only view a first content stored in a first separate compartment of an interior of the enclosure when the entry barrier is in the closed position, wherein the image sensor is further configured to be triggered by the activator to capture at least one image of both the first content stored in the first separate compartment and a second content stored a second separate compartment of the interior of the enclosure when the entry barrier is in the opened position, wherein the second separate compartment is visually obstructed from the image sensor when the entry barrier is in the closed position, wherein a field of view (FOV) of the image sensor is expanded as the entry barrier transitions from the closed position to the opened position thereby causing the image sensor to move outward and away from the body of the enclosure, and wherein the expanded FOV also covers the previously visually obstructed second separate compartment of the interior of the enclosure, the expanded FOV not possible when the entry barrier is in the closed position.

2. The system of claim 1 wherein the activator includes at least one of a gyroscope and an accelerometer.

3. The system of claim 1 wherein the image sensor is configured to capture at least one of a still image and a video image.

4. The system of claim 1 further comprising at least one of a temperature sensor, a light sensor, a humidity sensor and a power status sensor.

5. The system of claim 1 further comprising a transmitter configured to send the at least one image to at least one of a management system and an internal memory device.

6. The system of claim 5 wherein the transmitter is configured to receive a second image from a second image capture system, wherein the transmitter is further configured to send the second image to at least one of the management system and the internal memory, and wherein the second image is acquired from a different angle relative to the at least one image.

7. The system of claim 1 further comprising an image recorder configured to record the at least one image.

8. The system of claim 1 further comprising a secondary motion sensor configured to be coupled to a body of the enclosure and configured to provide a reference positional value of the body thereby enabling the activator to determine a relative positional value between the entry barrier and the body.

9. The system of claim 1 further comprising an illuminator configured to be triggered by the activator to provide illumination to the interior of the enclosure.

10. An enclosure having an entry barrier with an integrated auto-triggering image capture system, the enclosure comprising:
    a refrigerated enclosure body;
    an entry barrier operatively coupled to the enclosure body; and
    an integrated image capture system including:
        an activator configured to be operatively coupled to the entry barrier, wherein the activator is further configured to generate a trigger upon detecting a positional change of the entry barrier relative to the enclosure body, wherein the position change ranges from a closed position to an opened position; and
        an interior image sensor configured to be attached to an interior-facing location of the entry barrier thereby causing the interior image sensor to move relative to the body of the enclosure in response to a corresponding motion of the entry barrier, the image sensor configured to only view a first content stored in a first separate compartment of an interior of the enclosure when the entry barrier is in the closed position, wherein the image sensor is further configured to be triggered by the activator to capture at least one image of both the first content stored in the first separate compartment and a second content stored a second separate compartment of the interior of the enclosure when the entry barrier is in the opened position, wherein the second separate compartment is visually obstructed from the image sensor when the entry barrier is in the closed position, wherein a field of view (FOV) of the image sensor is expanded as the entry barrier transitions from the closed position to the opened position thereby causing the image sensor to move outward and away from the body of the enclosure, and wherein the expanded FOV also covers the previously visually obstructed second separate compartment of the interior of the enclosure, the expanded FOV not possible when the entry barrier is in the closed position.

11. The enclosure of claim 10 wherein the activator includes at least one of a gyroscope and an accelerometer.

12. The enclosure of claim 10 wherein the image sensor is configured to capture at least one of a still image and a video image.

13. The enclosure of claim 10 further comprising at least one of a temperature sensor, a humidity sensor and a power status sensor.

14. The enclosure of claim 10 further comprising a transmitter configured to send the at least one image to a management system.

15. The enclosure of claim 14 wherein the transmitter is configured to receive a second image from a second image capture system, and wherein the transmitter is further configured to send the second image to the management system.

16. The enclosure of claim 10 further comprising an image recorder configured to record the at least one image.

17. The enclosure of claim 10 further comprising a secondary motion sensor configured to be coupled to a body of the enclosure and configured to provide a reference positional value of the body thereby enabling the activator to determine a relative positional value between the entry barrier and the body.

18. The enclosure of claim 10 further comprising an illuminator configured to be triggered by the activator to provide illumination to the interior of the enclosure.

19. The enclosure of claim 10 wherein the entry barrier is slidably coupled to the enclosure body.

20. The enclosure of claim 10 wherein the entry barrier is rotatably coupled to the enclosure body, and wherein the interior image sensor is further configured to mechanically rotate and re-orientate relative to the entry barrier and thereby automatically and continually compensating for a corresponding angular rotation of the entry barrier relative to the enclosure body thereby synchronously maintaining an optimal FOV for the image sensor relative to the enclosure body.

21. The enclosure of claim 14 wherein the image includes at least one previously visually obstructed content inside the enclosure thereby providing stock status information to the management system and enabling the management system to initiate restocking or invoicing.

* * * * *